United States Patent [19]

Katoh et al.

[11] Patent Number: 4,641,215
[45] Date of Patent: Feb. 3, 1987

[54] EXPOSURE CONTROL DEVICE FOR ELECTRONIC PHOTOGRAPHING APPARATUS

[75] Inventors: Akira Katoh; Masatoshi Ida; Kouichi Shijima; Makoto Oishi; Akihiko Hashimoto; Shinya Takahashi, all of Tokyo, Japan

[73] Assignee: Olympus Optical Co., Ltd., Tokyo, Japan

[21] Appl. No.: 472,126

[22] Filed: Mar. 4, 1983

[30] Foreign Application Priority Data

Mar. 10, 1982 [JP] Japan .................................. 57-37375

[51] Int. Cl.$^4$ ........................ H04N 5/78; H04N 9/491
[52] U.S. Cl. .................................. 360/35.1; 358/310; 358/906
[58] Field of Search ............... 358/310, 312, 335, 906, 358/213, 224, 43, 41; 360/35.1; 354/227.1, 219

[56] References Cited

U.S. PATENT DOCUMENTS

| | | | |
|---|---|---|---|
| 3,890,628 | 6/1975 | Gurtler | 354/227 |
| 4,007,488 | 2/1977 | Monshita et al. | 358/213 X |
| 4,131,919 | 12/1978 | Lloyd et al. | 360/9.1 |
| 4,281,339 | 7/1981 | Morishita et al. | 358/52 |
| 4,366,501 | 12/1982 | Tsunekawa et al. | 358/310 |

Primary Examiner—Aristotelis M. Psitos
Attorney, Agent, or Firm—Frishauf, Holtz, Goodman & Woodward

[57] ABSTRACT

An exposure control device for an electronic photographing apparatus comprises a gate circuit, which can transfer a transfer gate driving signal to a transfer gate in synchronism to the horizontal vertical synchronization control of said solid state image sensor, and a shutter driving circuit, which can operate a shutter in synchronism with a transfer gate driving signal first generated after the appearance of a shutter release signal. While the shutter is open, the gate circuit inhibits the transfer gate driving signal.

1 Claim, 15 Drawing Figures

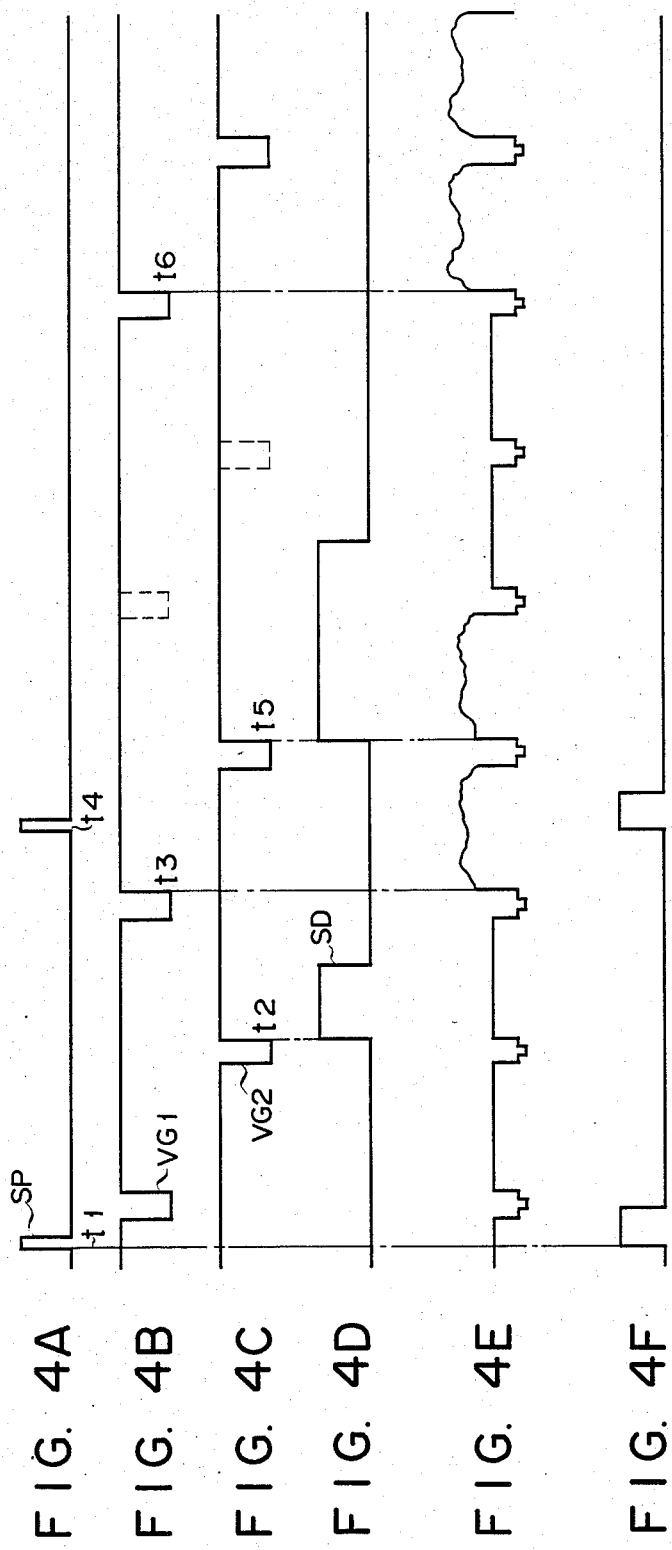

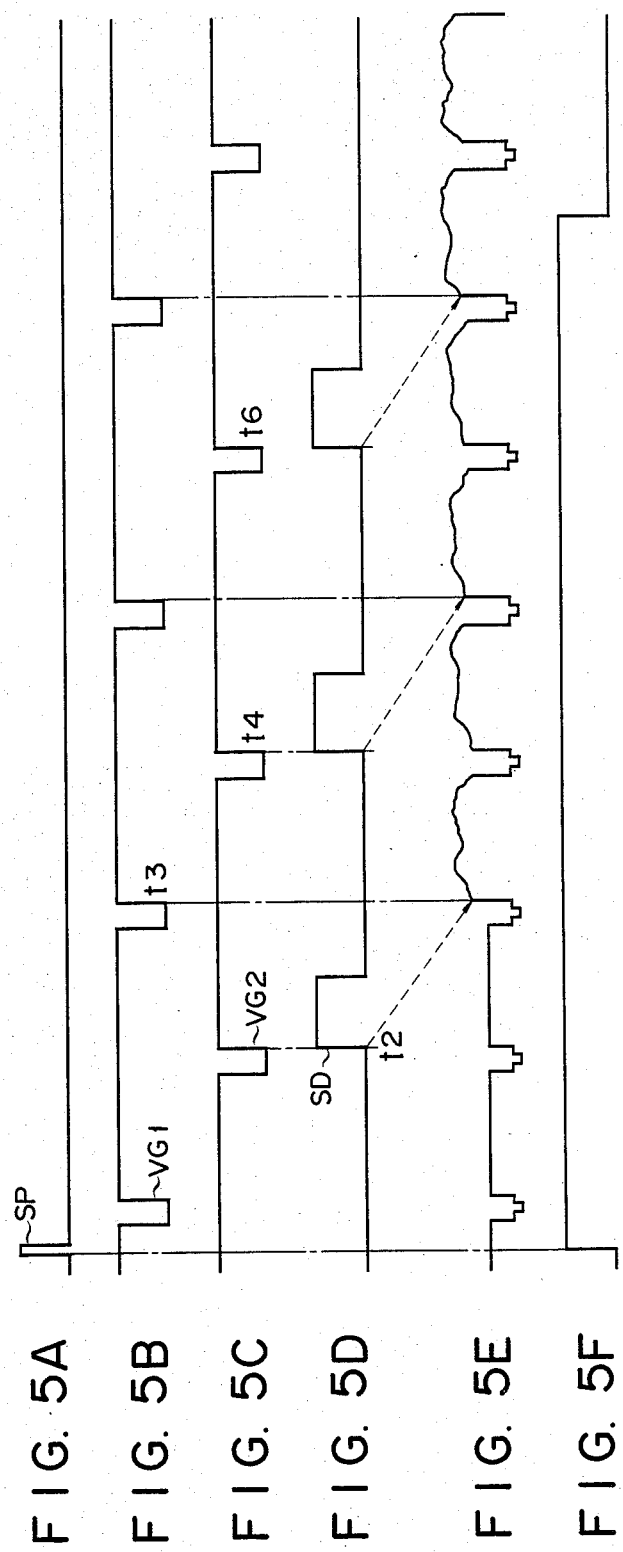

EXPOSURE CONTROL DEVICE FOR ELECTRONIC PHOTOGRAPHING APPARATUS

BACKGROUND OF THE INVENTION

This invention relates to an exposure control device for an electronic photographing apparatus, which controls exposure when photographing an object using a solid state image sensor.

An electronic photographing apparatus for photographing an object using a solid state image sensor constituted by a charge transfer device (CTD), e.g., a CCD or a BBD, is well known as a solid state video camera or an electronic still camera. In such electronic photographing apparatus the exposure is controlled by varying the period of integration of the charge stored in the CCD, for instance. The integration period is set by determining the timing of the on-off operation of a transfer gate in the CCD from the relation between a shutter release pulse and a exposure signal. Therefore, the control of the CCD, i.e., the horizontal and vertical scanning control, and the on-off control of the transfer gate are not synchronized, and a shutter speed faster than 1/60 sec. cannot be set accurately. Further, the CCD control and the transfer gate on-off control are not synchronized to the rotation of the magnetic disc. Therefore, the record start points of individual frames are not aligned on the recording disc, so that a frame cannot be readily retrieved in playback.

SUMMARY OF THE INVENTION

An object of the invention is to provide an exposure control device for an electronic photographing apparatus, which permits the shutter speed to be set in a broad range, and with which proper exposure thus can be obtained.

According to the invention, there is provided an exposure control device for an electronic photographing apparatus, which comprises means for generating transfer gate driving clock pulses VG1, VG2 in synchronism to a synchronizing pulse for a solid state image sensor, means for generating a shutter release pulse SP in response to a shutter release operation, means for generating a shutter drive pulse SD in response to a clock pulse generated first from the transfer gate driving clock pulse generating means after the appearance of the shutter release pulse, shutter means opened in response to the shutter drive pulse, gate means for inhibiting the transfer gate drive pulse in response to the shutter drive pulse, and exposure control means for calculating exposure to produce an exposure signal supplied to the shutter means.

BRIEF DESCRIPTION OF THE DRAWINGS

FIG. 4, consisting of A–F, is a time chart for explaining the operation of the embodiment of FIG. 1 in a one-shot photographing mode; and FIG. 5, consisting of A–F, is a time chart for explaining the operation of the embodiment of FIG. 1 in a continuous shot photographing mode.

DETAILED DESCRIPTION OF THE PREFERRED EMBODIMENT

Figure 1:
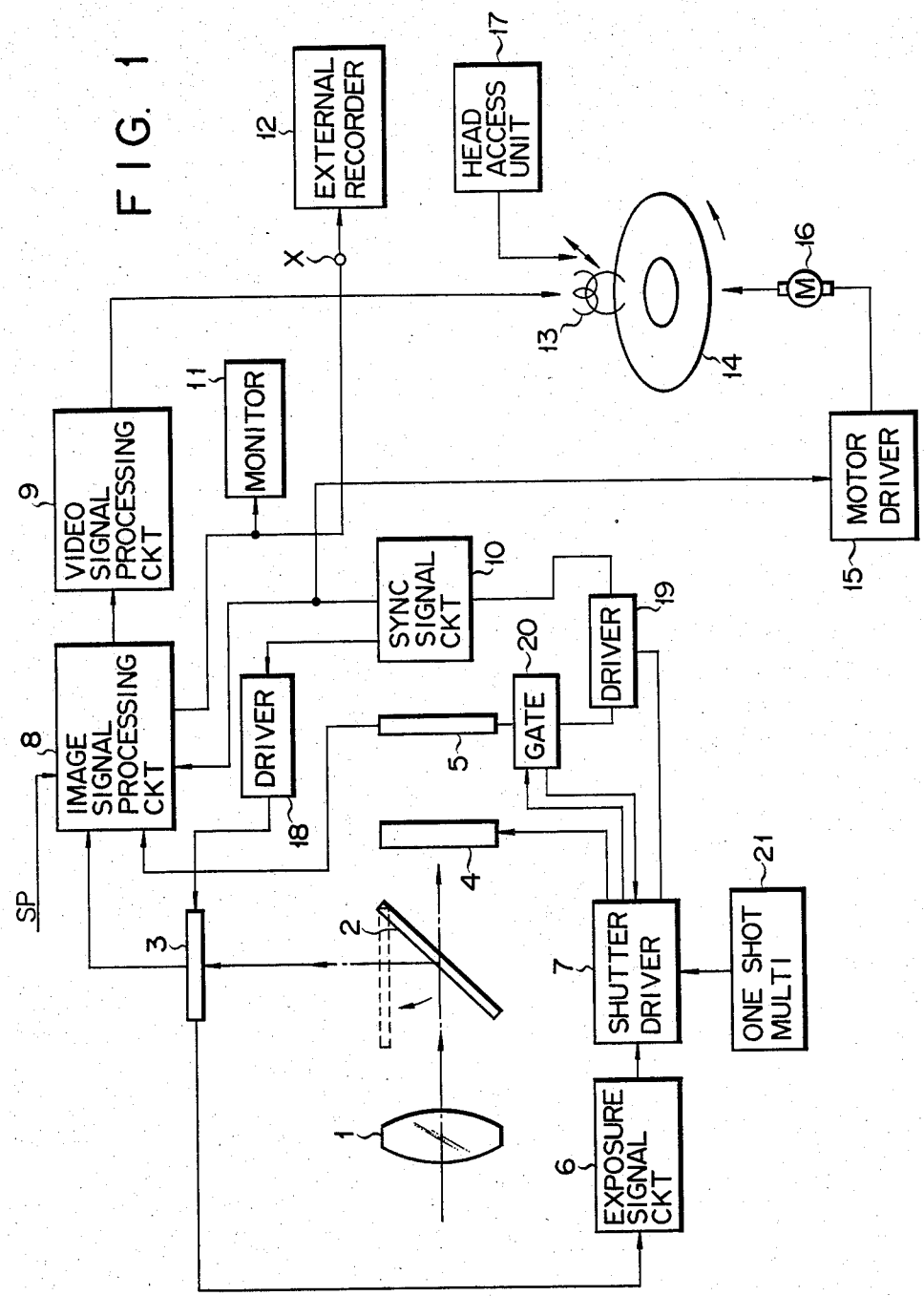
FIG. 1 is a block diagram showing an embodiment of the electronic photographing apparatus having an exposure control device according to the invention.

Referring to FIG. 1, an objective lens system 1 of a solid state image camera faces a quick return mirror 2 having a total reflection surface. The mirror 2 is vertically movable and can be put down as shown by solid lines, in a television (TV) mode. In this position, the mirror 2 can reflect light from the objective lens system 1 to a first solid state image sensor 3. In a still photographic mode, the mirror 2 is set in an "up" position, as shown by dashed lines. In this position of the mirror 2, light from the objective lens system 1 is led through a shutter 4 to a second solid state image sensor 5. In the still photographic mode, an exposure is measured by the first image sensor 3 prior to the image pick-up operation. After the measurement of the exposure is completed, the mirror 2 is brought to the "up" position of the dashed lines.

The first image sensor 3 may be of a single plate structure having color filters, e.g., striped color filters, as used in a color video camera. The shutter 4 is an electronically-timed shutter or a solid state shutter using a liquid crystal and has a high speed response characteristic. The second image sensor 5 may have the same construction as the first image sensor 3. This sensor is blocked from the light by the shutter 4 unless the camera is in the still photographic mode. Thus, it does not require an overflow drain, so it has a sufficient effective photosensitive area.

An exposure control signal generator 6 determines a proper exposure time from a sum signal, which is obtained from an image signal charge from the effective image sensing elements of the first solid state image sensor 3 and overflow charge obtained from an overflow drain of the image sensor 3.

Figure 2:
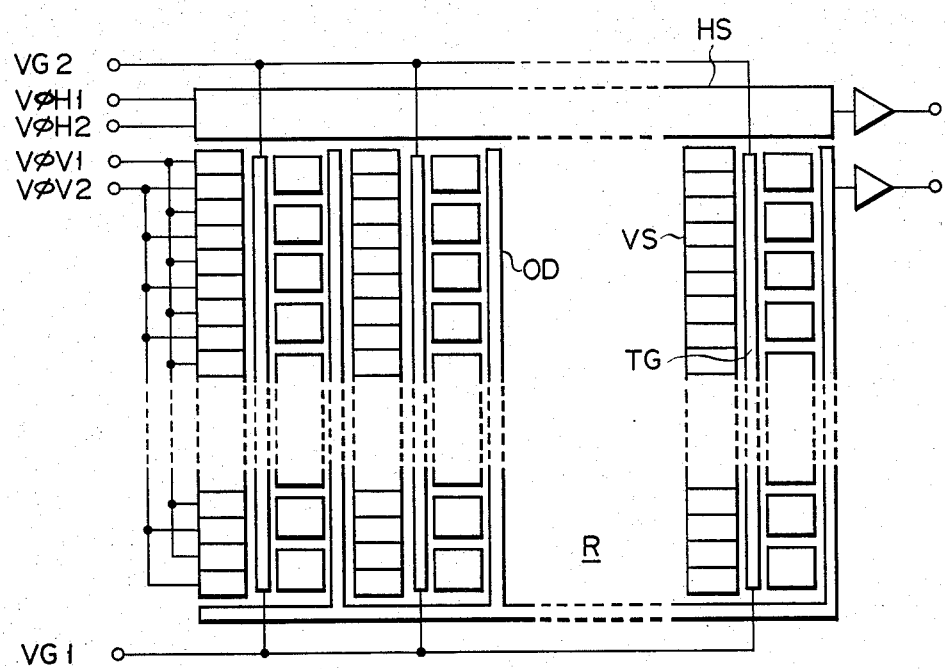
FIG. 2 is a plan view showing a solid state image sensor used in the apparatus of FIG. 1.

FIG. 2 shows an example of the first solid state image sensor 3. It is an interlace transfer type image sensor using a CCD. It has an overflow drain OD, from which the overflow output as noted before is provided. The image sensor 3 is driven in conformity with the NTSC television system. Switching signals VG1 and VG2 which are supplied to its transfer gate TG are generated with a cycle period of 1/30 sec. Thus, the signal charge integration time which corresponds to the conventional still camera shutter speed is 1/30 sec. Excess signal charges that may be generated in the effective photosensitive section when light of high energy level is incident on the section, are caused to flow into the overflow drain OD. Blooming control is effected in this way. The solid state image sensor 3 is used to determine the proper exposure level for controlling the shutter speed when obtaining a still picture. In this case, the effective photosensitive section may be saturated with an exposure time of 1/30 sec. or less. In such a case, the proper exposure cannot be determined from the signal charge alone. Accordingly, when the foregoing object is so bright that a high speed shutter must be used, a sum signal of the signal charge and overflow charge is supplied to the exposure signal control generator 6 to determine the exposure. Further, since the solid state image sensor 3 is formed of effective image sensing elements which are arranged in a two-dimensional array, two-dimensional image data may be used to determine the exposure. The two-dimensional image data permits selection of a simple photometry mode such as an average or partial photometry. Further, through a suitable additional image processing it is possible to select a particular photographic mode or generate an alarm signal or the like.

Referring back to FIG. 1, an image signal processor 8 can receive image signals read out from the solid state image sensors 3 and 5 and convert them into corresponding NTSC signals. The NTSC signal output of the image signal processor 8 is supplied to a monitor 11, and is also supplied to an external recording medium 12 such as a VTR through an output terminal X. The output of the image signal processor 8 is also supplied to a video signal processing circuit 9. When a shutter release button (not shown) is depressed to provide a signal SP, the video signal processing circuit 9 converts the output signal of the image signal processor 8 into a video signal suited for recording. The video signal is supplied to a magnetic head 13. The video signal processing circuit 9 may be a well-known circuit which can convert the NTSC signal into a video signal suitable for recording. For example, it may be one, which separates the chrominance (color) signal and luminance (brightness) signal and subjects the chrominance signal to low frequency conversion while frequency-modulating the luminance signal. The converted chrominance signal and frequency-modulated luminance signal are combined, and the resultant signal is amplified to an adequate level to be supplied to the magnetic head 13. The magnetic head 13 records the video signal from the video signal processing circuit 9 on a magnetic disc 14. To be more specific, the magnetic disc 14 is rotated by a motor 16, which is in turn driven by a motor drive circuit 15. It is rotated at a predetermined angular speed (e.g., 1,800 rpm when recording the image signal in concentric circular tracks with one frame per track), whereby the video signal can be recorded in particular tracks. In the magnetic disc 14, concentric circular tracks are formed, and for recording the next image, the magnetic head 13 is moved in the radial direction of the disc 14 at a predetermined track pitch by a head access unit 17.

If the shutter release button is not depressed, the image signal processor 8 converts the output of the solid state image sensor 3 into a corresponding NTSC signal and supplies this signal to the monitor 11. The monitor 11 is a video monitor, which can be driven by an NTSC signal, e.g., an electronic viewfinder, a liquid crystal television set or an EL panel. The signal supplied to the monitor 11 may also be supplied through the output terminal X to an external video recorder such as a VTR for recording it.

A synchronizing signal generator 10, in FIG. 1, generates various pulses necessary for the image signal processor 8 and also generates a composite synchronizing signal which is added to the image signal. The output signals of the synchronizing signal generator 10 are supplied to the image signal processor 8 and drivers 18 and 19. The synchronizing signal that is supplied to the image signal processor 8 is used for controlling the rotation of the motor 16 such that data can be recorded in an aligned state in individual tracks of the magnetic disc 14. The synchronizing signal is also supplied to the drivers 18 and 19 to synchronize the driving of the solid state image sensors 3 and 5 by the drivers 18 and 19. The drivers 18 and 19 generate predetermined drive pulses, by which the respective solid state image sensors 3 and 5 are driven. When the first solid state image sensor 3 is to be driven, a television mode (or NTSC mode) is set. Where the interlace transfer type CCD as noted before is used, the signal charge stored in the photosensitive section R, shown in FIG. 2, in the television mode, is transferred from the section R through a transfer gate TG to a vertical shift register VS in a transfer section during the vertical blanking period. With the interlace transfer type CCD, the signal charge is transferred from every other picture element in each field to the vertical shift register VS during the blanking period of each field. The signal charge integration time which corresponds to the shutter speed is thus 1/30 sec. With the progressive transfer of signals for one horizontal scanning line to a horizontal shift register HS during the horizontal blanking period, the signal charge transferred to the vertical shift register VS is transferred in the horizontal direction during the 15.75 kHz horizontal line period to be extracted as the image signal.

The second solid state image sensor 5, shown in FIG. 1, which is used to obtain a still picture, operates in a manner slightly different from the solid state image sensor 3. To be more specific, its operation is interlocked to the shutter release button. The operation of the solid state image sensor 5 will now be described with reference to FIGS. 3 to 5.

Figure 3:
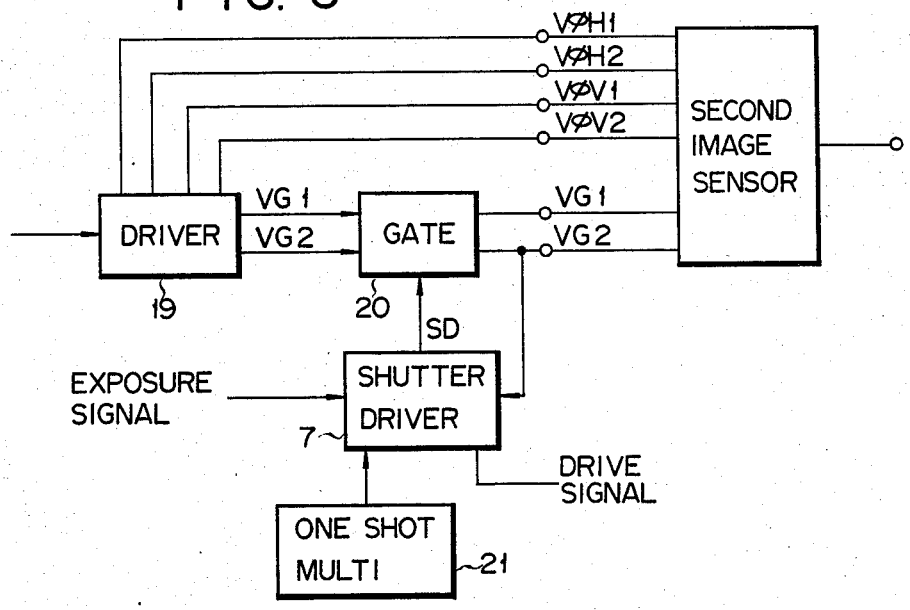
FIG. 3 is a circuit diagram showing a circuit for driving the solid state image sensor of FIG. 2.

Referring to FIG. 3, when an NTSC television synchronizing signal is supplied from the synchronizing signal generator 10 to the driver 19, the driver 19 produces drive pulses for driving the solid stage image sensor 5. The drive pulse is fed to a gate circuit 20. Signals B and C shown in FIG. 4 are clock pulses VG1 and VG2 for driving the transfer gate. The signal charge stored in the photosensitive section R during the charge storing period is transferred to the vertical shift register VS during the vertical flyback period under the control of these pulses. In the embodiment of FIGS. 3 and 4, the transfer gates of the second solid state image sensor 5 are respectively enabled when the clock signals VG1 and VG2 alternatively go to a low level. The pulse signals VG1 and VG2 correspond commonly termed VD pulses as television signals. They are related as $$fVG1=fVG2=\tfrac{1}{2}\times fVD$$

wherein fVG1 and fVG2 represent the frequencies of the pulse signals VG1 and VG2, respectively. They are 180° out of phase with each other. The driver 19 also produces vertical shift register drive pulses V$\phi$V1 and V$\phi$V2. These pulses correspond to commonly termed HD pulses as television signals. The signal charge transferred to the vertical shift register VS and the signal charge for one horizontal scanning line in the horizontal flyback period are progressively transferred to the horizontal shift register HS under the control of these pulses. The driver 19 further produces horizontal shift register drive clock pulses V$\phi$H1 and V$\phi$H2. These pulses are used to form a horizontal scanning signal by progressively taking out the signal charge for one horizontal scanning line that has been transferred to the horizontal shift register HS.

The signals VG1 and VG2 from the driver 19 and a shutter drive pulse signal SD from the shutter drive circuit 7 are fed to the gate circuit 20.

In this embodiment, the shutter 4, shown in FIG. 1, is an electronic shutter or a solid state light shutter which provides a low permeability when incident light is reduced, that is, which is held closed, while the drive pulse SD is present.

While the shutter drive pulse SD is present, the gate circuit 20 inhibits the pulses VG1 and VG2 so that no drive signal is supplied to the solid state image sensor 5.

When the shutter drive pulse SD goes to a low level, a subsequent transfer gate drive pulse first fed to the gate circuit is also inhibited if it is the pulse VG2.

The shutter drive circuit 7 sets the pulse width of the shutter drive pulse SD to a value corresponding to the proper exposure according to an exposure signal provided from the exposure signal circuit 6. The timing, with which the shutter drive pulse SD which has the present pulse width as noted above, is determined in the following way. A shutter pulse SP, as shown in FIG. 4, is produced in an interlocked relation to the operation of depressing the shutter release button (not shown) at any time. This shutter pulse SP is fed to the shutter drive circuit 7. The shutter drive circuit 7 produces the shutter drive pulse SD with the rising of the pulse VG2 that is supplied first from through the gate circuit 20 to the shutter drive circuit 7.

In the still photographic mode, there are two distinct modes, i.e., a one-shot mode and a continuous shot mode. These two modes can be switched one from the other by a select switch (not shown). The operation in the one-shot mode will first be described in detail with reference to the timing chart of FIGS. 4A to 4F. The solid state image sensor 5 is operative with charge stored in the photosensitive section due to dark current being drained out while the shutter 4 is closed. Subsequent to the appearance of a shutter pulse SP produced at an instant t1 in an interlocked relation to the operation of the shutter release button, the shutter drive circuit 7 produces the shutter drive pulse SD to close the shutter 4 at an instant t2 with the rising of the pulse VG2 produced first afterwards. The integration of the signal charge in the second solid state image sensor 5 thus commences from this instant. It is to be noted that the shutter operation is started 1/30 sec. at the most after the operation of the shutter release button. After a predetermined shutter period has passed, the shutter 4 is closed to bring an end to the signal charge integration. With the subsequent gate pulse VG1 the read-out of the signal charge for the first field is started from an instant t3, while the read-out of the signal for the second field is started with the subsequent pulse VG2. With this interlace function, the image signal processor 8 produces an NTSC signal as shown in FIG. 4E. When the shutter release button is depressed again at a subsequent instant t4, a second pulse SP is subsequently produced so that a pulse SD is produced at a later instant t5 in the manner described above. The shutter speed is faster than 1/60 sec. when the shutter release button is depressed for the first time, but it is slower than 1/60 sec. when the shutter release button is released for the second time. A pulse VG1 that is fed to the gate circuit 20 during the presence of the shutter release pulse SD shown in FIG. 4D, is inhibited as shown by dashed line in FIG. 4B. Also, if the pulse supplied first to the gate circuit 20 after the closing of the shutter 4 is a pulse VG2, it is inhibited. That is, if the shutter release pulse SP is again generated within the pulse width of the pulse SD i.e. the exposure period, the shutter drive circuit 7 is not triggered again during a predetermined period to not produce the next pulse SD. With the rising of a pulse VG1 at an instant t6, the transfer of the signal charge to the vertical shift register VS is started, and the signal charge read-out is similarly done subsequently with the interlace function.

It is to be noted that in the one-shot mode the shutter is opened and closed in response to an operation of the shutter release button.

The continuous shot mode will now be described with reference to the timing chart of FIGS. 5A to 5F. When the shutter release button is depressed at an instant t1 as shown in FIG. 5F, a shutter pulse SP is produced as shown in FIG. 5A. At a subsequent instant t2, a pulse SD as shown in FIG. 5D is produced to open the shutter 4 in the same manner as described before in connection with the one-shot mode, thus starting the integration of the signal charge. At a subsequent instant t3, the read-out of the signal charge for the first field is started with the rising of a gate pulse VG1. At a further subsequent instant t4, the read-out of signal charge for the second field is started with the rising of the gate pulse VG2. When the shutter release button is held depressed, i.e., when the continuous shot mode has been selected, with the rising of the next gate pulse VG2 at an instant t4, the next pulse SD is produced to cause the integration of signal charge and read-out thereof in the same manner. So long as the shutter release button is held depressed, pulses SD are produced each with the rising of each pulse VG2 through the gate circuit 20, and a still picture is obtained every time a pulse SD is produced. In the case of FIGS. 5A to 5F, the shutter speed is faster than 1/60 sec. The shutter 4 is opened and closed for every 1/30 sec., whereby continuous shots at a rate of 30 frames/sec. can be obtained. Where the shutter speed is slower than 1/60 sec., continuous shots are possible at a rate of 30/(n+2) frames/sec. (n being 0, 1, 2, 3, . . . ) where T is the shutter speed in seconds given as $$(2n+1)/60 < T \leq (2n+3)/60$$

In the still photographic mode, simultaneously with the rotation of the mirror 2 caused in response to the operation of the shutter release button, the select switch in the image signal processor 8 is operated to couple the output signal of the second solid state image sensor 5 in lieu of the output signal of the first solid state image sensor 3 as a signal for forming the NTSC signal. During the high shutter speed continuous shot mode, the still picture may be displayed on the monitor 11.

While a preferred embodiment of the invention has been described in the foregoing, it is to be understood that the embodiment is given for the purpose of illustration only and various changes and modifications are possible. For example, while the above embodiment has complied with the NTSC television system, it is also possible to comply with other television standards such as high grade television standards and PAL standards. Further, while an image sensor formed of effective image sensing elements as charge transfer elements arranged in a two-dimensional array has been used as the first solid state image sensor, it is also possible to use the following image sensing elements.

1. An ordinary single-cell image sensing element such as a photodiode. (This element may be mounted in and desired position.)

2. A two-dimensional array of a plurality of independent image sensing elements. (This array again may be mounted in any desired position.)

Further, while the magnetic disc has been used as the recording medium, it is possible to use other recording mediums such as an optical magnetic disc.

As has been described in the foregoing, according to the invention a solid state image sensor for movie photographing and a solid state image sensor for still photographing are provided, with a shutter disposed on the light incidence side of the still photographing image sensor. The shutter is opened in synchronism with a synchronizing pulse VG2 generated first after the appearance of a shutter release pulse. The period, during which the shutter is open, is determined by an exposure control circuit which determines the exposure from the image signal from the television image sensor. While the shutter is open, the transfer gate driving signal VG1 or VG2 is inhibited, that is, it is not supplied to the still photographing image sensor.

With the exposure control device according to the invention, the shutter is operated in synchronism to a synchronizing signal for driving an image sensor, so that proper exposure can be obtained with the shutter speed set to a desired speed from a low speed to a high speed. Further, the image signal processor for processing the still image signal and the recording disc device for recording the still image signal are operated in synchronism with each other. Thus, the start points of individual frames can be aligned to facilitate the retrieval and reproduction of frames.

What we claim is:

1. An electronic photographing system comprising:
   an objective lens system for receiving incident light from an object;
   first solid state image sensor means for receiving said incident light through said objective lens system for producing an image signal usable to measure an exposure, and also usable to form a television image signal;
   second solid state image sensor means for receiving said incident light through said objective lens system for producing an image signal for still picture recording;
   shutter means for blocking the incident light to said second solid state image sensor means at a predetermined timing;
   first driving means for driving said first solid state image sensor means so as to enable said first solid state image sensor means to issue the image signal;
   second driving means for driving said second solid state image sensor means and including means for generating a plurality of driving pulses including a first driving pulse for reading out an image signal corresponding to a first field and a second driving pulse for reading out an image signal corresponding to a second field;
   shutter driving means for driving said shutter means for controlling an exposure time during which said second solid state image sensor means responds to the image signal issued from said first solid state image sensor means, said shutter driving means including an exposure control signal generator means for providing an exposure signal to determine a proper exposure time on the basis of an output signal from said first image sensor means, and said shutter driving means providing a shutter drive pulse based on said exposure control signal in synchronism with said second driving pulse, said shutter drive pulse having a pulse width corresponding to the exposure time;
   gate circuit means for controlling passage of said first and second driving pulse to said second solid state image sensor means so as to inhibit said first and second driving pulses while said shutter drive pulse is present and also to inhibit said second driving pulse anticipant of said first driving pulse immediately after extinction of the shutter drive pulse;
   synchronizing signal generator means for generating pulses including first synchronizing pulses and second synchronizing pulses respectively supplied to said first driving means and to said second driving means;
   recording means responsive to operation of a shutter release for recording an image data signal on a recording medium, said image date signal corresponding to the image signal issued from a selected one of said first solid state image sensor means and said second solid state image sensor means; and
   means coupled to said synchronizing signal generator means for driving said recording medium in synchronism with the operation of at least one of said first driving means and said second driving means under synchronization control based on an output from said synchronizing signal generator means.

* * * * *